(12) United States Patent
Kim et al.

(10) Patent No.: US 12,519,114 B2
(45) Date of Patent: Jan. 6, 2026

(54) MODELING METHODS FOR DESIGNING FUEL CELL FLOW FIELD

(71) Applicant: KOREA INSTITUTE OF ENERGY RESEARCH, Daejeon (KR)

(72) Inventors: Min Jin Kim, Daejeon (KR); Young Jun Sohn, Daejeon (KR); Hwan Yeong Oh, Daejeon (KR); Yoon Young Choi, Sejong-si (KR); Seung Gon Kim, Daejeon (KR); Won Yong Lee, Daejeon (KR); Tae Hyun Yang, Daejeon (KR); Seok Hee Park, Daejeon (KR); Sung Dae Yim, Daejeon (KR); Seung Hee Woo, Daejeon (KR); Yun Sik Kang, Seoul (KR); Gu Gon Park, Daejeon (KR); Eun Jik Lee, Daejeon (KR); So Jeong Lee, Daejeon (KR); Byung Chan Bae, Daejeon (KR); Dong Won Shin, Sejong-si (KR); Hye Jin Lee, Daejeon (KR); Dong Hwan Park, Gwangju (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 496 days.

(21) Appl. No.: 18/080,113

(22) Filed: Dec. 13, 2022

(65) Prior Publication Data

US 2023/0187659 A1   Jun. 15, 2023

(51) Int. Cl.
*H01M 8/0258*   (2016.01)
*H01M 8/04298*  (2016.01)
*H01M 8/1004*   (2016.01)

(52) U.S. Cl.
CPC ..... *H01M 8/0258* (2013.01); *H01M 8/04305* (2013.01); *H01M 8/1004* (2013.01)

(58) Field of Classification Search
CPC .......... H01M 8/0258; H01M 8/04305; H01M 8/1004
See application file for complete search history.

(56) References Cited

FOREIGN PATENT DOCUMENTS

| CN | 111914414 A | 11/2020 |
|---|---|---|
| KR | 10-2020-0106953 A | 9/2020 |

OTHER PUBLICATIONS

Korean Office Action for Korean Application No. 10-2021-0178735, dated Mar. 28, 2024.
Zhang et al., "Combination effects of flow field structure and assembly force on performance of high temperature proton exchange membrane fuel cells," International Journal of Energy Research, vol. 45, 2021, pp. 7903-7917.

(Continued)

*Primary Examiner* — Sarah A. Slifka
(74) *Attorney, Agent, or Firm* — Birch, Stewart, Kolasch & Birch, LLP

(57) ABSTRACT

A modeling method for designing a flow field of a fuel cell including a membrane electrode assembly including a catalyst layer and an electrolyte membrane, a gas diffusion layer, a flow field, and a bipolar plate includes modeling using a numerical model derived from a governing equation including a mass conservation equation of species, a fluid momentum in a porous media, and a modified Butler-Volmer's equation and outputting an oxygen diffusion characteristic in a catalyst layer from the modeling result.

5 Claims, 5 Drawing Sheets

(a)

(b)

(56) References Cited

OTHER PUBLICATIONS

Park et al., "A Study on Oxygen Diffusion Characteristics According to Changes in Flow Field Shape of Polymer Electrolyte Membrane Fuel Cell Metallic Bipolar Plate for Building", Korean Hydrogen and New Energy Society, vol. 32, No. 4, Aug. 2021, pp. 245-255.

Zhang et al., "Combination effects of flow field structure and assembly force on performance of high temperature proton exchange membrane fuel cells," International Journal of Energy Research, vol. 45, Issue 5, Jan. 3, 2021, pp. 7903-7917.

[FIG. 1]
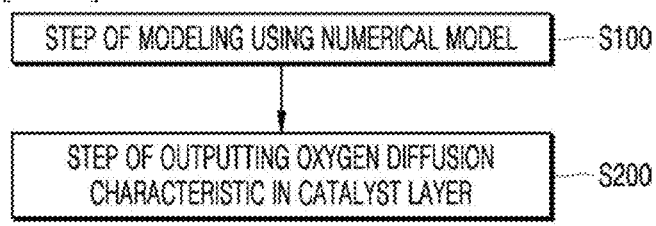
[FIG. 2]
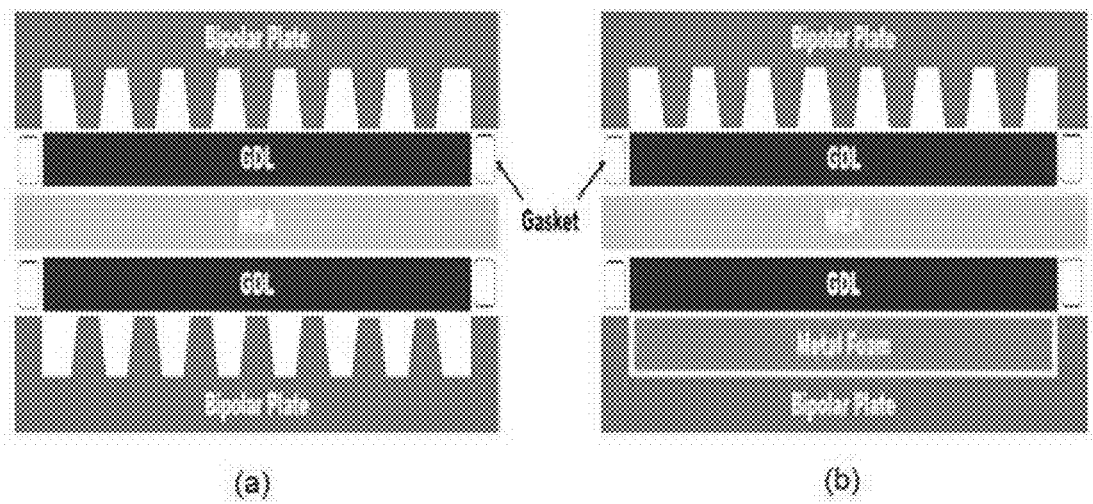

[FIG. 3]
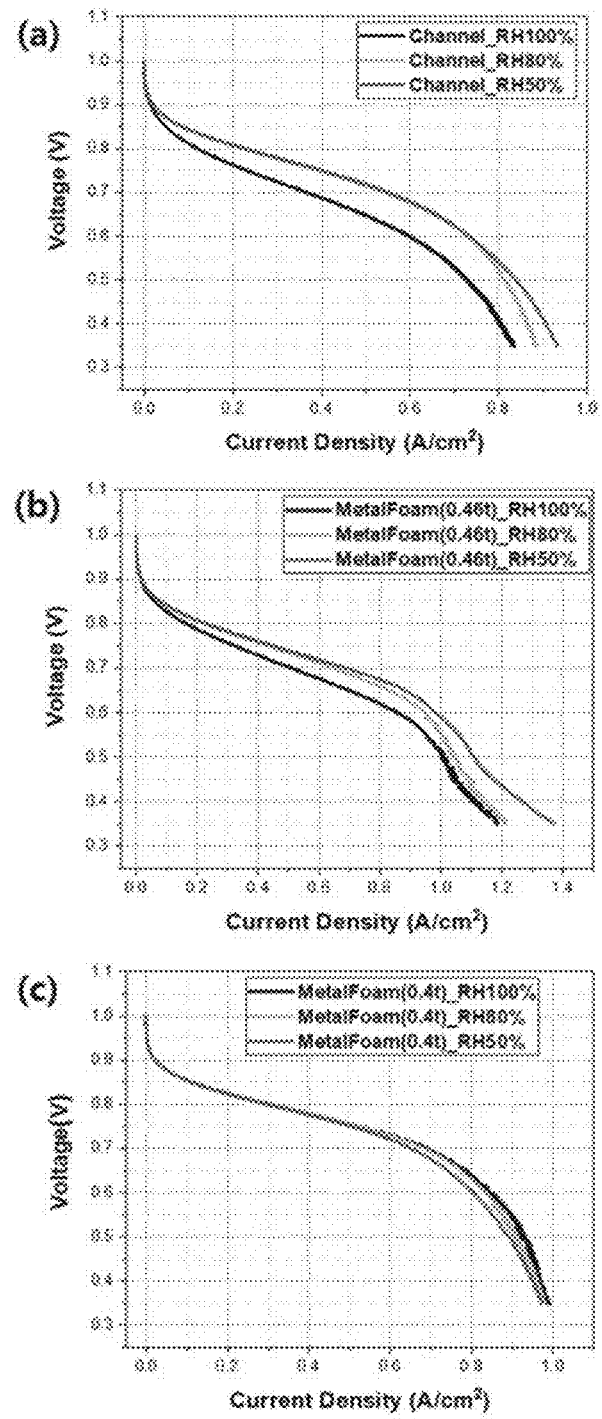

[FIG. 4]
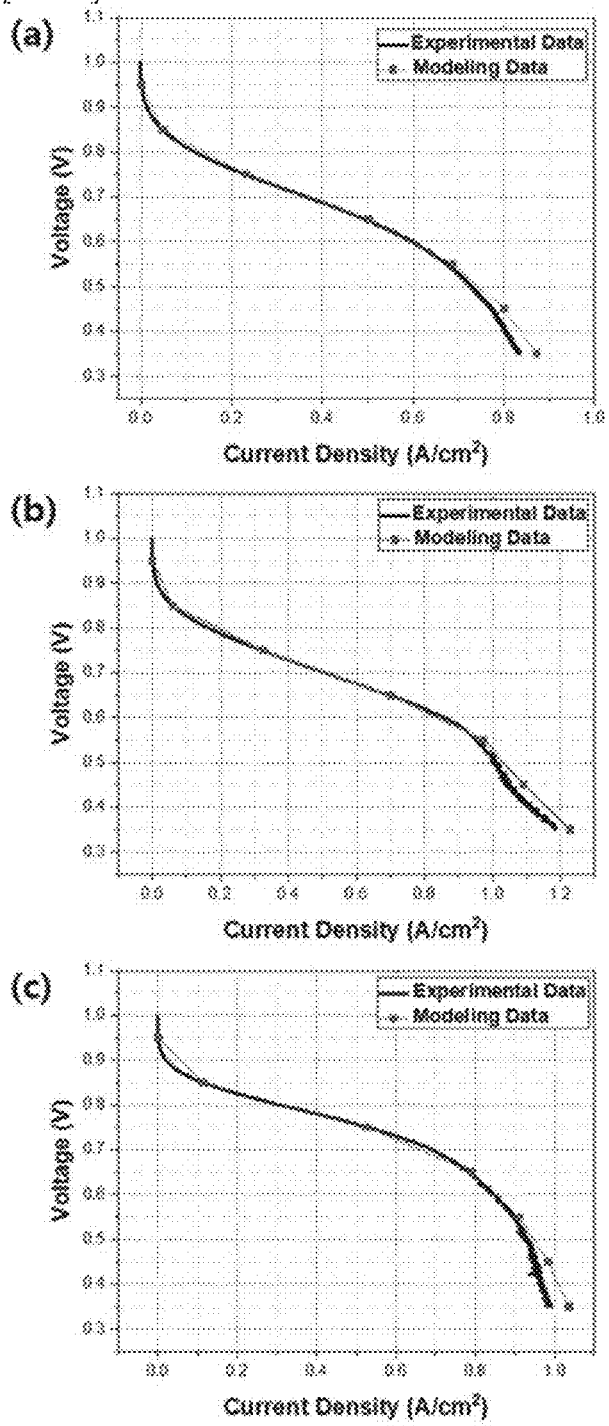

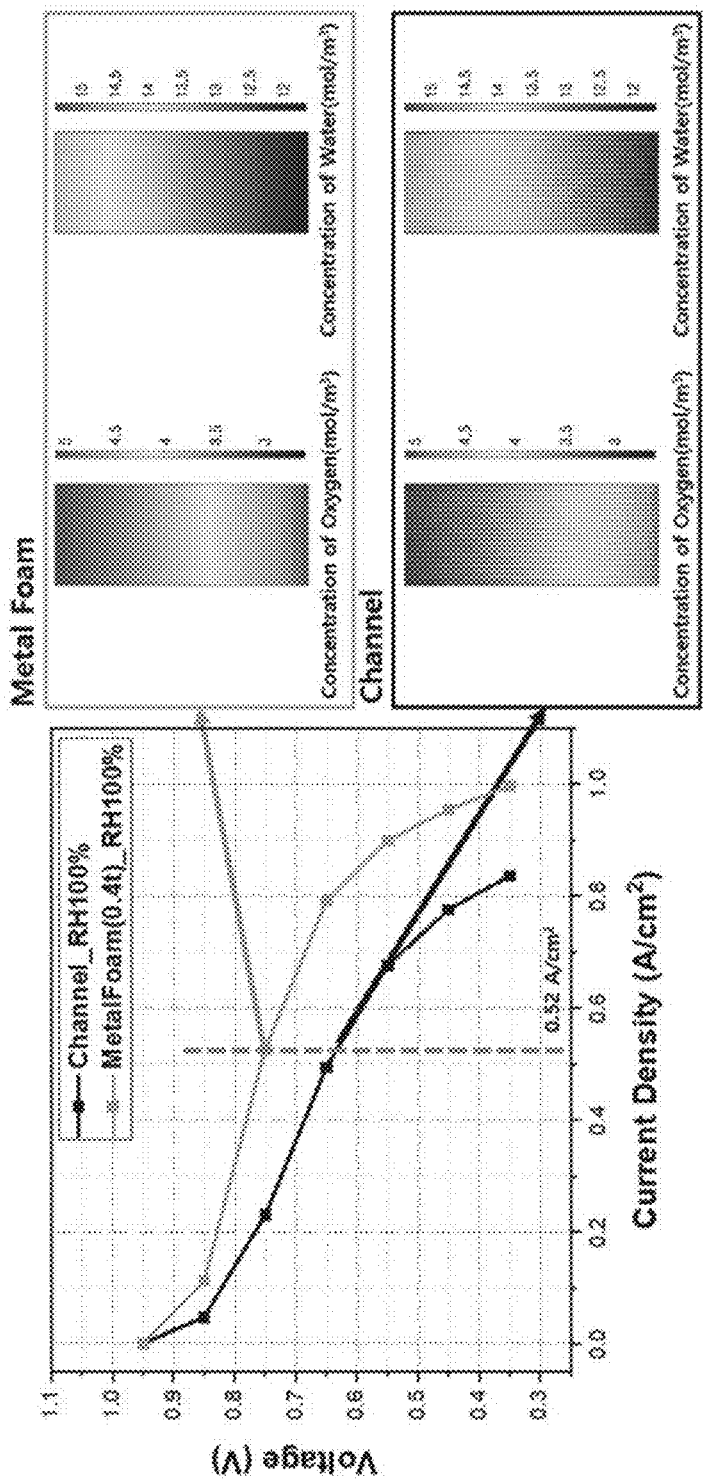
[FIG. 5]

[FIG. 6]
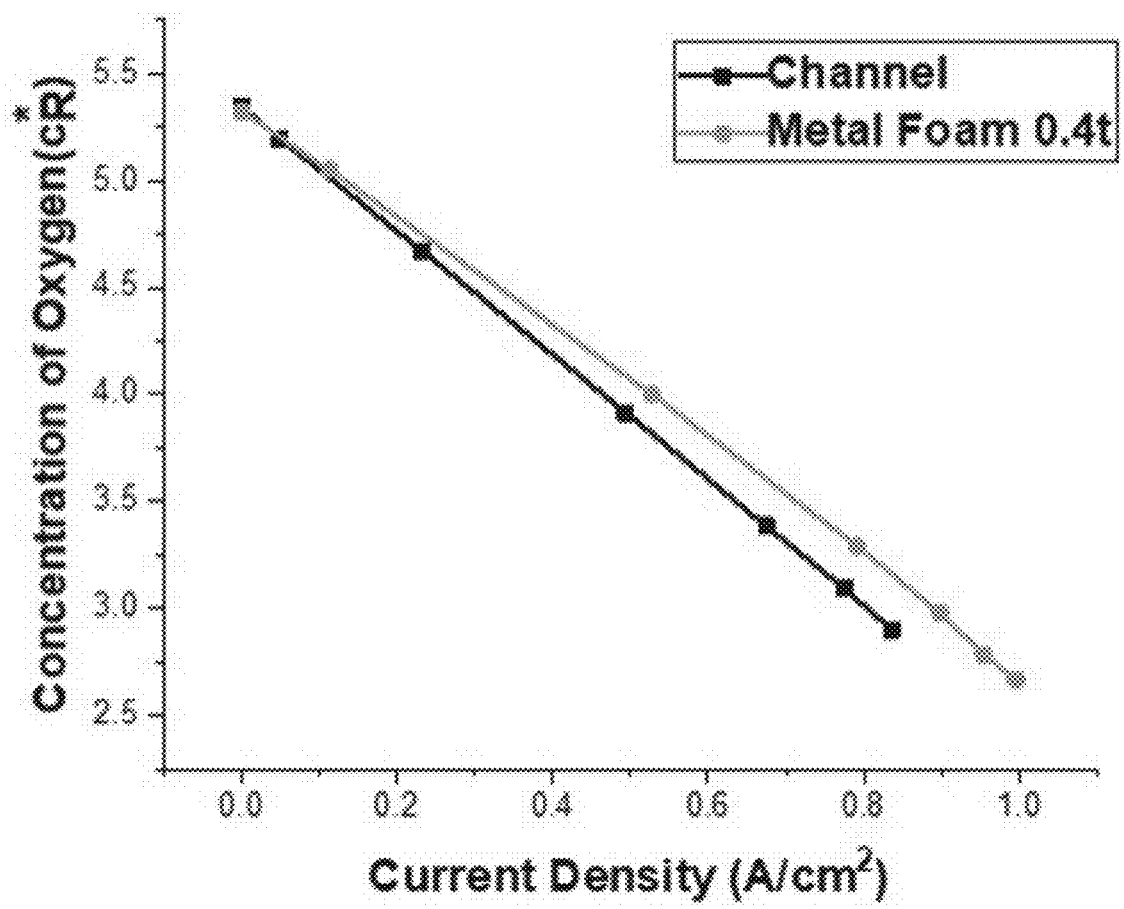

MODELING METHODS FOR DESIGNING FUEL CELL FLOW FIELD

CROSS-REFERENCE TO RELATED APPLICATION

This present application claims the benefit of priority to Korean Patent Application No. 10-2021-0178735, entitled "Modeling Methods for Designing Fuel Cell Flow Field," filed on Dec. 14, 2021, in the Korean Intellectual Property Office, the entire disclosure of which is incorporated herein by reference.

FIELD

Various exemplary embodiments of the present disclosure relate to a modeling method for designing a fuel cell flow field, and more particularly, to a modeling method for selecting an optimal flow field by identifying an oxygen diffusion characteristic.

BACKGROUND

Recently, climate change such as sweltering heat and floods has occurred all over the world, which causes great damage to life and property, and global warming due to greenhouse gas is being mentioned as the main culprit of such climate change. A large amount of greenhouse gases is emitted by indiscriminate use of coal, oil, and gas which are used as energy sources by mankind. Accordingly, many efforts are being made all over the world to minimize greenhouse gas emission and produce eco-friendly energy, and interest in fuel cells that can produce energy through hydrogen without using carbon which is the main culprit of greenhouse gas is expanding.

There are various types of fuel cells. However, the polymer electrolyte membrane fuel cell (PEMFC) has advantages, such as a low operation temperature of 100° C. or lower, a short start-up time, and quick response to load fluctuations, so that it is applied to vehicles, homes, and buildings to be used. The biggest difference of the fuel cell for vehicles and the fuel cell for households/buildings is a driving environment. The fuel cell for vehicles is operated in a relatively high current density area so that a lot of water is generated and it is difficult to manage the water. Therefore, a flow field and a diffusion layer specialized to remove the water are used. Further, the performance needs to be secured even under the low humidity condition after water removal so that there is a trend to mainly use a membrane electrode assembly (MEA) for low humidity. However, in contrast, the fuel cell for households/buildings is driven in a low current density area so that the difficulty for the water management is less than that of the fuel cell for vehicles, and the MEA which can secure the performance under high humidity conditions is mainly used.

The performance of the PEMFC is greatly affected by the mass transfer of reactants and products. In order to improve the performance of the fuel cell, the reactants need to be evenly diffused to a catalyst layer through the flow field and a gas diffusion layer while maintaining a high concentration. Further, the product which is produced by the reaction, that is, the water, needs to be quickly removed so as not to interfere with the catalytic reaction. The mass transfer of the PEMFC is mainly performed by the flow field and the gas diffusion layer so that PEMFC mass transfer optimization strategy is to optimize the flow field to efficiently supply the reactants and remove the products.

In order to achieve the fuel cell mass transfer optimization, various studies on the flow field are being conducted. Further, it is effective to apply a metal separator to reduce the price and the volume of the stack for smooth commercialization of the fuel cell so that studies on the flow field of the metal separator are also actively being conducted. Studies to apply 3D fine mesh flow field modeling used for a fuel cell electric vehicle (FCEV) and apply the 3D fine mesh flow field to Toyota Mirai which is the FCEV, and studies on the development of Toyota Mirai which is the PEMFC vehicle to which the metal separator is applied are mainly being conducted. Until now, the PEMFC metal separator flow field studies are mainly limited to the fuel cell for vehicles, and studies on the metal separator flow field considering an operating environment of fuel cells for buildings have been insignificant so far. That is, studies on the metal separator flow field considering a PEMFC operating environment for buildings are necessary.

SUMMARY

An object of the present disclosure is to provide a modeling method that derives mass transfer optimization and optimal flow field design according to shape deformation of the flow field of the fuel cell metal separator.

A modeling method for designing a flow field of a fuel cell including a membrane electrode assembly including a catalyst layer and an electrolyte membrane, a gas diffusion layer, a flow field, and a bipolar plate includes modeling using a numerical model derived from a governing equation including a mass conservation equation of species, a fluid momentum in a porous media, and a modified Butler-Volmer's equation; and outputting an oxygen diffusion characteristic in a catalyst layer from the modeling result.

According to the modeling method of the present disclosure, the oxygen concentration and the water removal effect which are oxygen diffusion characteristics in a catalyst layer according to the change in the flow field may be confirmed and thus, the performance of the fuel cell is confirmed. That is, the higher the oxygen concentration in the catalyst layer and the better the water removal effect, the higher the current generated in the fuel cell, thereby selecting an optimal flow field. That is, the present disclosure may contribute to the selection of the optimal flow field of the polymer electrolyte membrane fuel cell for buildings and the provision of basic data for mass transfer required for a stack design.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a flowchart for explaining a modeling method for designing a fuel cell flow field of the present disclosure;

FIG. 2 is a configuration and a cross-sectional structure of a unit cell according to an exemplary embodiment of the present disclosure;

FIG. 3 is an IV curve according to the change in relative humidity for every flow field according to Experimental Example 1 of the present disclosure;

FIG. 4 is a validation result of experimental data and modeling data for every flow field when a relative humidity is 100%;

FIG. 5 illustrates comparison of modeling results of a channel type and a metal foam (0.4 t) type when the relative humidity is 100%, and concentration distribution of oxygen and water in a catalyst layer; and FIG. 6 is a graph obtained by comparing oxygen concentrations of catalyst layers of a channel type and a metal foam (0.4 t) type when a relative humidity is 100%.

DETAILED DESCRIPTION

Hereinafter, various exemplary embodiments of the present disclosure will be described with reference to accompanying drawings. Examples and terms used therein are not intended to limit the technology described in the present disclosure to specific embodiments, and should be understood to include various modifications, equivalents, and/or substitutes of the embodiments.

Hereinafter, desirable exemplary embodiments of a modeling method for designing a fuel cell flow field according to the present disclosure will be described in detail with reference to the accompanying drawings.

FIG. 1 is a flowchart for explaining a modeling method for designing a fuel cell flow field of the present disclosure.

The present disclosure is a modeling method for designing a flow field of a fuel cell including a membrane electrode assembly (MEA) including a catalyst layer and an electrolyte membrane, a gas diffusion layer (GDL), a flow field, and a bipolar plate. The modeling method of the present disclosure is applied to various types of fuel cells, and desirably, a polymer electrolyte membrane fuel cell (PEMFC).

Specifically, referring to FIG. 1, the modeling method according to various exemplary embodiments of the present disclosure may include a step S100 of modeling using a numerical model and a step S200 of outputting an oxygen diffusion characteristic in a catalyst layer.

At this time, the numerical model of the present disclosure may be derived from the governing equations including a mass conservation equation of species, a fluid momentum in porous media, and a modified Butler-Volmer's equation.

Specifically, movement of reactants which enter into the cell from the inlet from the flow field to the catalyst layer may be expressed using the mass conservation equation of the species.

Specifically, the mass conservation equation of the species (i) may be expressed by the following Equations (1) to (5).

$$\frac{\partial}{\partial t}(\rho\omega_i) + \nabla \cdot (\rho\omega_i u) = -\nabla \cdot (j)_L + R_i \quad (1)$$

(Here, $\rho$ is a density of a fluid, w is a mass fraction, u is a velocity of a fluid, $j_L$ is a mass flux, and R is a source term consumed or produced by the reaction.)

Since it is assumed that the changes in partial pressure and temperature do not affect the multi-component diffusion, the change may be simplified using a mixed average diffusion model.

$$\nabla \cdot j_L + \rho(u \cdot \nabla)\omega_i = R_i \quad (2)$$

A diffusive flux of the species i may be defined as follows.

$$j_L = -\left(\begin{array}{c} \rho D_i^m \nabla \omega_i + \rho \omega_i D_i^m \frac{\nabla M_n}{M_n} - \\ \rho \omega_i \sum^i \frac{M_i}{M_n} D_h^m \nabla x_k + D_i^T \frac{\nabla T}{T} \end{array}\right) \quad (3)$$

(Here, $D^m_i$ is a mixed average diffusion coefficient of the species i, $D^m_k$ is a mixed average diffusion coefficient of the species k, Mn is a molar mass, $x_k$ is a molar fraction, and T is a temperature of a unit cell.)

A thermal diffusion coefficient may be defined as follows.

$$D_i^T = \frac{1-\omega_i}{\sum\limits_{i\neq 1} \frac{x_k}{D_{ik}}} \quad (4)$$

(Here, $D^T_i$ is a thermal diffusion coefficient and $D_{ik}$ is multi-component Maxwell-Stefan diffusivity.)

The average molar mass may be defined as follows.

$$M_n = \left(\sum^i \left(\frac{\omega_i}{M_i}\right)\right)^{-1} \quad (5)$$

(Here, M is an average molar mass.)

The mass transfer of the fuel cell is performed through the flow field and the gas diffusion layer, and the metal foam flow field and the gas diffusion layer are formed of fine porous structure. Accordingly, in order to develop the fuel cell numerical model, it is necessary to define a fluid momentum in such a porous medium.

The fluid momentum in the porous medium may be expressed by the following Equations (6) and (7).

$$\frac{1}{\varepsilon_p}\rho(u\cdot\nabla)u\frac{1}{\varepsilon_p} = \nabla \cdot [-pI + K] - \left(\mu k^{-1} + \beta\epsilon_p|u| + \frac{Q_m}{\varepsilon_p^2}\right)u + F \quad (6)$$

(Here, $\varepsilon$ is a porosity of a porous media, p is a pressure, I is a unit matrix, K is a distribution coefficient, $\mu$ is a kinematic coefficient of viscosity, $\kappa$ is a permeability of a porous media, $\beta$ is a Forchheimer drag coefficient, Q is a mass source term, and F is a Faraday constant.)

The mass source may be defined as follows.

$$\nabla \cdot (\rho u) = Q_m \quad (7)$$

In the numerical model, it is modeled by specifying only a cathode area so that the existing Butler-Volmer's equation is modified to be used. Specifically, the modified Butler-Volmer's equation may be expressed by the following Equations (8) to (10).

$$i = i_0 \left(\frac{\exp\left(\frac{\alpha_a}{RT}F\eta_c\right)-}{\left(\frac{C_{O_2}}{C_{O_2,ref}}\right)\exp\left(-\frac{\alpha_t}{RT}F\eta_c\right)}\right) \quad (8)$$

(Here, $i_0$ is an exchange current density, $\alpha_a$ is an anode transfer coefficient, $\alpha_c$ is a cathode transfer coefficient, R is a gas constant, $C_{O2}$ is an oxygen concentration in a catalyst layer, $C_{O2,ref}$ is a reference oxygen concentration in the catalyst layer, and $\eta_c$ is a cathode overpotential.)

The cathode overpotential may be defined as follows.

$$\eta_c = E_{cell} - (E_{OCV} + R_0 \times i_{loc}) = E_{cell} - E_T \quad (9)$$

(Here, $E_{cell}$ is a voltage of a unit cell, $E_{OCV}$ is an open circuit voltage of a unit cell, $R_0$ is a collective effective resistance, i is a current, and $E_T$ is a theoretical voltage of a fuel cell.)

An exchange current density may be defined as follows.

$$i_0 = nFC_{O_2}f_1 e^{-\Delta g_1^{\ddagger}/RT} \quad (10)$$

(Here, n is a number of electrons (n=2) moving through the electrochemical reaction, F is a Faraday constant, f is a decay rate to a product, $\Delta g_1^{\ddagger}$ is a size of a positive reaction active barrier, R is a gas constant, and T is a cell temperature.)

In the meantime, the step S100 of modeling using a numerical model may further includes a step of validating an accuracy of the numerical model.

Specifically, the validation step may include: a step of estimating an oxygen concentration $C^*_R$ in the catalyst layer using the numerical model;

a step of estimating an exchange current density $j_0$ from the following Equation (11) based on the oxygen concentration;

$$j_0 = nFc^*_R f_1 e^{-\Delta G_1^{\ddagger}/(RT)} \quad (11)$$

a step of calculating a current density using the Butler-Volmer's Equation (12) based on the oxygen concentration $C^*_R$ and the exchange current density $j_0$; and $$j = j_0 \left( \exp\left(\frac{\alpha_a}{RT} F\eta_c\right) - \left(\frac{c^*_R}{c^0_{R,ref}}\right) \exp\left(-\frac{\alpha_c}{RT} F\eta_c\right) \right) \quad (12)$$

a step of estimating parameters $j_0$, $\alpha_a$, and $\alpha_c$ by matching the current density and experimental data.

In the step S200 of outputting an oxygen diffusion characteristic in the catalyst layer, the oxygen distribution and the water distribution in the catalyst layer may output output as illustrated in FIG. 5, as the modeling result using the numerical model. Alternatively, as illustrated in FIG. 6, an oxygen concentration in the catalyst layer may be output.

According to the modeling method of the present disclosure, the oxygen concentration and the water removal effect which are oxygen diffusion characteristics in a catalyst layer according to the change in the flow field may be confirmed and thus, the performance of the fuel cell may be confirmed. That is, the higher the oxygen concentration in the catalyst layer and the better the water removal effect, the higher the current generated in the fuel cell, thereby selecting an optimal flow field.

Hereinafter, this will be described in detail through specific Example Embodiments of the present disclosure.

However, the following Example Embodiments are to illustrate the present disclosure and the present disclosure is not limited by the following Example Embodiments.

Example Embodiment 1: Production of Unit Cell Having Channel Type (Trapezoidal Flow Path) Flow Field A unit cell having a channel type flow field designed as represented in the following Table 1 and FIG. 2A was produced.

TABLE 1

| Parameter | Value | Unit |
|---|---|---|
| Top width | 0.94 | mm |
| Bottom width | 1.26 | mm |
| Height | 0.6 | mm |

TABLE 1-continued

| Parameter | Value | Unit |
|---|---|---|
| Active Area | 40 | cm² |
| Number of Channels | 18 | — |

Example Embodiment 2: Production of Unit Cell Having Metal Foam Type Flow Field

A unit cell having a metal foam type flow field designed as represented in the following Table 2 and FIG. 2B was produced. That is, unit cells having a metal foam type flow field each having a respective thickness of 0.46 mm and 0.4 mm were produced. To this end, the bipolar plate was dug to a depth of 0.46 mm and 0.4 mm to secure a space for the metal foam to enter, respectively. Further, as the metal foam, a nickel foam plated with gold was used.

TABLE 2

| Parameter | Value | Unit |
|---|---|---|
| Height | 0.46/0.4 | mm |
| Porosity | 0.85 | mm |
| Permeability | 4.9E−7 | mm |
| Pore Size | 50 to 300 | cm² |
| Active Area | 40 | — |

Experimental Example 1: Experimental Data Result

The experiment was performed using an MEA having an active area size of 40 cm² as a unit cell and a JNT30-A6 as a gas diffusion layer (GDL), hydrogen and air were used as fuels, a flow rate was adjusted by a mass flow controller (MFC), and hydrogen was set to 520 sccm, and air was set to 2000 sccm. The temperature of the unit cell was controlled to 60° C. and the relative humidity RH was adjusted to 100%, 80%, and 50%. In order to prevent gas condensation due to the temperature change after the fuel passed through the humidifier, a humidifier outlet line was maintained to be 5° C. or higher than the unit cell temperature, and in order to uniformly maintain the driving temperature, a cooling fan and a heater were used.

In the case of the flow field experiment, an output current value was measured by changing a voltage from 0.35 V to 1 V using an electronic load, and a voltage/current output characteristic curve (IV curve) was obtained with the values. The relative humidity was adjusted by controlling a temperature of Bubbler Humidifier, and the humidifier temperature was maintained to 60° C. with RH of 100%, the humidifier temperature was maintained to 55.3° C. with RH of 80%, and the humidifier temperature was maintained to 45.8° C. with RH of 50%, respectively.

In order to evaluate the performance of each flow field, the IV curve for every flow field was obtained. Further, in order to observe the influence of the relative humidity during the experiment, the experiment was conducted by adjusting the relative humidity for every flow field. The comparison of the performance was performed based on a current density at a target voltage of 0.75 V.

The results are represented in the following Table 3 and FIG. 3.

TABLE 3

| Relative humidity | Channel type | Metal foam type (0.46 t) | Metal foam type (0.4 t) |
|---|---|---|---|
| RH 100% | 0.2305 A/cm$^2$ | 0.3231 A/cm$^2$ | 0.5276 A/cm$^2$ |
| RH 80% | 0.4037 A/cm$^2$ | 0.4298 A/cm$^2$ | 0.5280 A/cm$^2$ |
| RH 50% | 0.3941 A/cm$^2$ | 0.4512 A/cm$^2$ | 0.5028 A/cm$^2$ |

That is, referring to Table 3 and FIG. 3A, in the case of a channel type according to Example Embodiment 1, when RH was 100%, the current density was 0.230 A/cm$^2$, when RH was 80%, the current density was 0.404 A/cm$^2$, and when RH was 50%, the current density was 0.394 A/cm$^2$.

Referring to Table 3 and FIG. 3B, in the case of a metal foam type with a thickness of 0.46 mm according to Example Embodiment 2, when RH was 100%, the current density was 0.323 A/cm$^2$, when RH was 80%, the current density was 0.430 A/cm$^2$, and when RH was 50%, the current density was 0.451 A/cm$^2$.

Referring to Table 3 and FIG. 3C, in the case of a metal foam type with a thickness of 0.4 mm according to Example Embodiment 2, when RH was 100%, the current density was 0.528 A/cm$^2$, when RH was 80%, the current density was 0.528 A/cm$^2$, and when RH was 50%, the current density was 0.502 A/cm$^2$.

It was confirmed from the experiment that a performance of the metal foam type was superior to the channel type, and thus and it was understood that the metal foam was more advantageous than the channel type for oxygen electrode mass transfer of a fuel cell. Further, for the same metal foam, it was confirmed that the smaller the thickness, the better the performance.

Experimental Example 2: Validation Result of Numerical Model of Present Disclosure In order to validate the accuracy of the numerical model of the present disclosure, the validation of the numerical model was conducted using experimental data. First, there was no detailed information for the MEA so that a parameter was estimated to get a parameter required for the numerical model. After estimating an average oxygen concentration in the catalyst layer by setting a boundary probe in the catalyst layer, an exchange current density was set, and an operating current was calculated by Butler-Volmer's equation, and then the parameter between the calculated operating current and the experimental data was estimated.

After estimating the parameter, experimental data and modeling data were compared and analyzed. FIG. 4 is a validation result of the experimental data and modeling data for every flow field when the RH is 100%.

Referring to FIG. 4, it was confirmed that the numerical model result and the experiment result similarly matched, and the numerical model well simulated the actual experiment.

Experimental Example 3: Modeling Result Using Numerical Model of Present Disclosure Experimental data was analyzed using a numerical model validated by the Experimental Example 2. By doing this, diffusion of reactant gas (oxygen) in the unit cell and an oxygen concentration in the catalyst layer which were not known from the experiment were confirmed.

The followings are main assumptions used in the model.
1) Laminar flow is assumed in all areas.
2) Reactants and products are treated as ideal gas mixtures.
3) All porous media are configured by uniform porous material.
4) Cell temperature distribution is uniform and constant.
5) Polymer electrolyte membrane is impervious to reactive gases.
6) Influence of gravity is ignored.

FIG. 5 illustrates comparison of modeling results of a channel type and a metal foam (0.4 t) type when the relative humidity is 100% and concentration distribution of oxygen and water in a catalyst layer.

Referring to FIG. 5, it is confirmed from the numerical model that the oxygen concentration in the cathode catalyst layer is evenly higher in the metal foam type than in the channel type. Further, it is understood that the water generated in the catalyst layer is more satisfactorily removed from the metal foam flow path.

FIG. 6 is a graph obtained by comparing oxygen concentrations in catalyst layers of a channel type and a metal foam (0.4 t) type when a relative humidity is 100%.

Referring to FIG. 6, it was confirmed that, in the catalyst layer, the oxygen concentration in the metal form type catalyst layer was maintained to be higher than that in the channel type. In the meantime, it is understood from Equation (8) that the higher the oxygen concentration, the higher the current generated from the fuel cell. That is, it is confirmed that the oxygen concentration difference in the catalyst layer causes the performance difference of the fuel cell. This is the same as the result confirming that the performance of the metal foam type is superior to the channel type from the Experimental Example 1. That is, it means that the oxygen diffusion characteristic in the channel layer is confirmed by the modeling method of the present disclosure so that the performance of the fuel cell is confirmed thereby. Accordingly, an optimal flow field may be selected by the modeling method of the present disclosure.

The features, structures, effects and the like described in the foregoing embodiments are included in at least one embodiment of the present disclosure and are not necessarily limited to one embodiment. Moreover, the features, structures, effects and the like illustrated in each embodiment may be combined or modified by those skilled in the art for the other embodiments to be carried out. Therefore, the combination and the modification of the present disclosure are interpreted to be included within the scope of the present disclosure.

In the above description, the present disclosure has been described based on the exemplary embodiments, but the exemplary embodiments are for illustrative, and do not limit the present disclosure, and those skilled in the art will appreciate that various modifications and applications, which are not exemplified in the above description, may be made without departing from the scope of the essential characteristic of the present exemplary embodiments. For example, each component described in detail in the embodiment can be modified. Further, the differences related to the modification and the application should be construed as being included in the scope of the present disclosure defined in the accompanying claims.

What is claimed is:

1. A modeling method for designing a flow field of a fuel cell including a membrane electrode assembly including a catalyst layer and an electrolyte membrane, a gas diffusion layer, a flow field, and a bipolar plate, the modeling method comprising:

modeling using a numerical model derived from a governing equation including a mass conservation equation of species, a fluid momentum in a porous media, and a modified Butler-Volmer's equation; and outputting an oxygen diffusion characteristic in a catalyst layer from the modeling result;

wherein the mass conservation equation of species i is expressed by the following Equations (1) to (5):

$$\frac{\partial}{\partial t}(\rho\omega_i) + \nabla \cdot (\rho\omega_i u) = -\nabla \cdot j_L + R_i \tag{1}$$

wherein $\rho$ is a density of a fluid, $\omega$ is a mass fraction, u is a velocity of a fluid, $j_L$ is a mass flux, and R is a source term consumed or produced by the reaction;

$$\nabla \cdot j_L + \rho(u \cdot \nabla)\omega_i = R_i \tag{2}$$

$$j_L = -\begin{pmatrix} \rho D_i^m \nabla \omega_i + \rho \omega_i D_i^m \frac{\nabla M_n}{M_n} \\ -\rho\omega_i \sum \frac{\delta}{M_n} \frac{M_i}{M_n} D_k^M \nabla x_k + D_i^T \frac{\nabla T}{T} \end{pmatrix} \tag{3}$$

wherein $D^m_i$ is a mixed average diffusion coefficient of the species i, $D^m_k$ is a mixed average diffusion coefficient of the species k, $M_n$ is a molar mass, $x_k$ is a molar fraction, and T is a temperature of a unit cell;

$$D_i^T = \frac{1-\omega_i}{\sum\limits_{i \neq 1} \frac{x_k}{D_{ik}}} \tag{4}$$

wherein $D^T_i$ is a thermal diffusion coefficient and $D_{ik}$ is a multi-component Maxwell-Stefan diffusivity;

$$M_n = \left(\sum^i \left(\frac{\omega_i}{M_i}\right)\right)^{-1} \tag{5}$$

wherein M is an average molar mass.

2. A modeling method for designing a flow field of a fuel cell including a membrane electrode assembly including a catalyst layer and an electrolyte membrane, a gas diffusion layer, a flow field, and a bipolar plate, the modeling method comprising:

modeling using a numerical model derived from a governing equation including a mass conservation equation of species, a fluid momentum in a porous media, and a modified Butler-Volmer's equation; and outputting an oxygen diffusion characteristic in a catalyst layer from the modeling result;

wherein the fluid momentum in the porous media is expressed by the following Equations (6) and (7):

$$\frac{1}{\varepsilon_p}\rho(u \cdot \nabla)u\frac{1}{\varepsilon_p} = \nabla \cdot [-pI + K] - \left(\mu k^{-1} + \beta\epsilon_p|u| + \frac{Q_m}{\varepsilon_p^2}\right)u + F \tag{6}$$

wherein $\varepsilon$ is a porosity of the porous media, p is a pressure, I is a unit matrix, K is a distribution coefficient, $\mu$ is a kinematic coefficient of viscosity, $\kappa$ is a permeability of a porous media, $\beta$ is a Forchheimer drag coefficient, Q is a mass source term, and F is a Faraday constant;

$$\nabla \cdot (\rho u) = Q_m \tag{7}$$

3. A modeling method for designing a flow field of a fuel cell including a membrane electrode assembly including a catalyst layer and an electrolyte membrane, a gas diffusion layer, a flow field, and a bipolar plate, the modeling method comprising:

modeling using a numerical model derived from a governing equation including a mass conservation equation of species, a fluid momentum in a porous media, and a modified Butler-Volmer's equation; and outputting an oxygen diffusion characteristic in a catalyst layer from the modeling result;

wherein the modified Butler-Volmer's equation is expressed by the following Equations (8) to (10):

$$i = i_0 \begin{pmatrix} \exp\left(\frac{\alpha_0}{RT}F\eta_c\right) \\ -\left(\frac{C_{O_2}}{C_{O_2 ref}}\right)\exp\left(-\frac{\alpha_c}{RT}F\eta_c\right) \end{pmatrix} \tag{8}$$

wherein $i_0$ is an exchange current density, $\alpha_a$ is an anode transmission coefficient, $\alpha_c$ is a cathode transmission coefficient, R is a gas constant, $C_{O2}$ is an oxygen concentration in a catalyst layer, $C_{O2,ref}$ is a reference oxygen concentration in the catalyst layer, and $\eta_c$ is a cathode overpotential;

$$\eta_c = E_{cell} - (E_{OCV} + R_0 \times i_{loc}) = E_{cell} - E_T \tag{9}$$

wherein $E_{cell}$ is a voltage of a unit cell, $E_{OCV}$ is an open circuit voltage of a unit cell, $R_0$ is a collective effective resistance, i is a current, and $E_T$ is a theoretical voltage of a fuel cell;

$$i_0 = nFC_o f_1 e^{-\Delta g_1^{\ddagger}/RT} \tag{10}$$

wherein n is a number of electrons (n=2) moving through the electrochemical reaction, F is a Faraday constant, f is a decay rate to a product, $\Delta g_1^{\ddagger}$ is a size of a positive reaction active barrier, R is a gas constant, and T is a cell temperature.

4. A modeling method for designing a flow field of a fuel cell including a membrane electrode assembly including a catalyst layer and an electrolyte membrane, a gas diffusion layer, a flow field, and a bipolar plate, the modeling method comprising:

modeling using a numerical model derived from a governing equation including a mass conservation equation of species, a fluid momentum in a porous media, and a modified Butler-Volmer's equation; and outputting an oxygen diffusion characteristic in a catalyst layer from the modeling result;

wherein in the outputting of an oxygen diffusion characteristic, at least one of an oxygen distribution and a water distribution in the catalyst layer and an oxygen concentration in the catalyst layer is output.

5. A modeling method for designing a flow field of a fuel cell including a membrane electrode assembly including a catalyst layer and an electrolyte membrane, a gas diffusion layer, a flow field, and a bipolar plate, the modeling method comprising:

modeling using a numerical model derived from a governing equation including a mass conservation equation of species, a fluid momentum in a porous media, and a modified Butler-Volmer's equation; and outputting an oxygen diffusion characteristic in a catalyst layer from the modeling result;

wherein the modeling further includes validating an accuracy of the numerical model, and the validating includes:

estimating an oxygen concentration in the catalyst layer using the numerical model;

estimating an exchange current density based on the oxygen concentration from the following Equation (11);

$$j_0 = nFc_R^* f_1 e^{-\Delta G_1^\ddagger/(RT)} \tag{11}$$

wherein $j_0$ is the exchange current density, n is a number of electrons (n=2) moving through the electrochemical reaction, F is a Faraday constant, $c_R^*$ is the oxygen concentration, f is a decay rate to a product, $\Delta g_1^\ddagger$ is a size of a positive reaction active barrier, R is a gas constant, and T is a cell temperature;

calculating a current density based on the oxygen concentration and an exchange current density using the following Equation (12); and $$j = j_0 \left( \exp\left(\frac{\alpha_a}{RT} F \eta_c\right) - \left(\frac{c_R^*}{c_{R,ref}^0}\right) \exp\left(-\frac{\alpha_c}{RT} F \eta_c\right) \right) \tag{12}$$

estimating parameters $j_0$, $\alpha_a$, and $\alpha_c$ by matching between the current density and experimental data.

* * * * *